July 26, 1927.
J. H. LEHMAN
GLASS WIPER
Filed Oct. 20, 1926
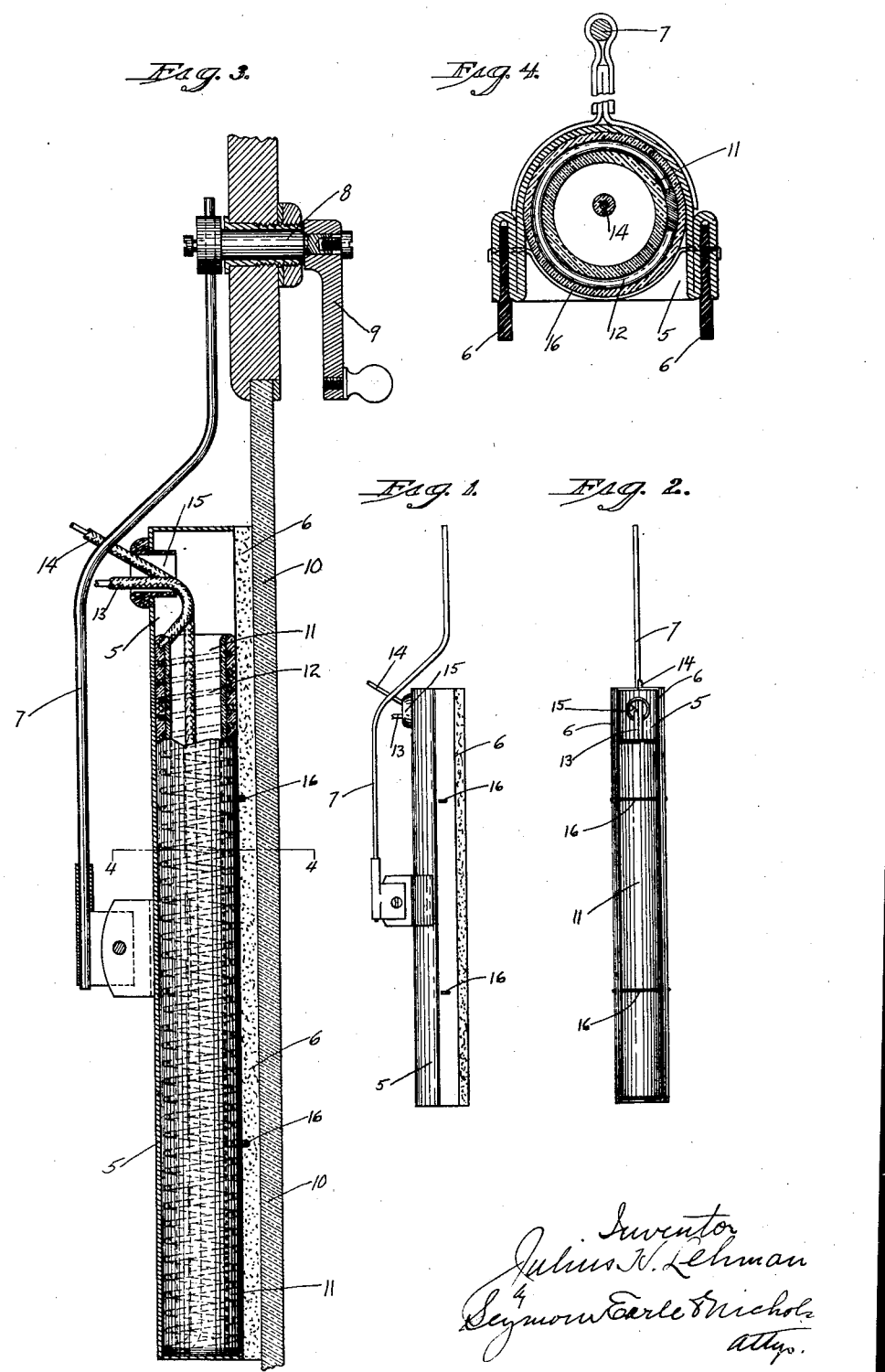

Patented July 26, 1927.

1,636,916

UNITED STATES PATENT OFFICE.

JULIUS H. LEHMAN, OF BRISTOL, CONNECTICUT.

GLASS WIPER.

Application filed October 20, 1926. Serial No. 142,961.

This invention relates to improvement in glass wipers, that is, devices mounted adjacent to a wind shield, so as to sweep across the line of vision to remove moisture therefrom, or for wiping any glazed surfaces, and particularly to devices of this character which are provided with heating elements, so as to operate in freezing weather and especially during sleet storms. The object of this invention is the production of a simple device whereby heat may be radiated against the surface of the glass, so as to permit the wiper to successfully operate, and the invention consists in a construction as hereinafter described and particularly recited in the claim.

In the accompanying drawings:

Fig. 1 is a side view of a glass wiper constructed in accordance with my invention;

Fig. 2 is a rear view of the same;

Fig. 3 is a vertical sectional view on a larger scale, with means for operating the device as a wind-shield wiper; and Fig. 4 is a sectional view on the line 4—4 of Fig. 3.

In carrying out my invention, I employ a housing 5, U-shape in cross-section and provided at its longitudinal edges with wipers 6 of rubber or other suitable material. This housing may be mounted on an arm 7 in the usual manner, which arm is connected with a rock-shaft 8 extending through the window-frame and provided on the inner side with a crank-handle 9, by which the shaft may be turned so as to move the wiper across the surface of the glass 10.

For convenience, I have illustrated my device as operated by hand, but it is obvious that, without further illustration, the device may be mechanically operated in the usual way of mechanically-operated wind shield wipers.

Within the housing is a tubular heating-unit 11, formed from vitreous or other suitable material, which will radiate heat, and embedded in this unit is a wire-coil 12, the terminals 13 and 14 of which extend through a bushing 15 to a battery, one of the terminals extending upward through said tubular unit. As shown, the heating-unit is held in place by transverse tie wires 16. In freezing wet weather, and particularly during sleet storms, the current may be turned on through the wires 13 and 14, and this current will heat the heating-unit 11, and the heat generated thereby will be radiated against the surface of the glass 10, so that, when the device is moved across the surface, the heat will melt and remove ice from the outer surface of the glass, so as to give the operator a clear vision. When heat is not required, the device operates in the usual manner of a wind-shield wiper.

While, for convenience, I have described my device with particular reference to a wind-shield wiper, it is obvious that it may be used for wiping glass, as in car windows or for household use.

I claim:

A glass wiper, comprising a housing U-shaped in cross section and mounted for movement over a glass, wipers mounted in the edges of the said housing and projecting beyond the edges thereof; an electric heating unit mounted in said housing, transverse tie-wires extending between the sides of the housing, whereby the said heating-unit is exposed to radiate heat against the glass, and means for connecting the heating unit with a source of current.

In testimony whereof, I have signed this specification.

JULIUS H. LEHMAN.